(12) United States Patent
Watanabe

(10) Patent No.: US 7,262,804 B2
(45) Date of Patent: Aug. 28, 2007

(54) AUTOFOCUS CAMERA ADJUSTING FOCUS LENS POSITION BASED ON ILLUMINATION CHARACTERISTICS

(75) Inventor: Toshimi Watanabe, Yokohama (JP)

(73) Assignee: Nikon Corporation, Tokyo (JP)

( * ) Notice: Subject to any disclaimer, the term of this patent is extended or adjusted under 35 U.S.C. 154(b) by 743 days.

(21) Appl. No.: 10/775,127

(22) Filed: Feb. 11, 2004

(65) Prior Publication Data
US 2004/0233320 A1    Nov. 25, 2004

(30) Foreign Application Priority Data
Feb. 13, 2003    (JP) .............................. 2003-034870

(51) Int. Cl.
H04N 5/232    (2006.01)
G03B 13/00    (2006.01)

(52) U.S. Cl. .................... 348/349; 348/354; 396/93; 396/102

(58) Field of Classification Search ................ 348/345, 348/346, 347, 348, 349, 350, 351, 352, 353, 348/354, 355, 356, 363, 364, 365; 396/89, 396/93, 95, 96, 101, 102, 108, 121, 124
See application file for complete search history.

(56) References Cited

U.S. PATENT DOCUMENTS

| 5,534,923 A | * | 7/1996 | Suda | 348/354 |
| 5,539,462 A | * | 7/1996 | Lee et al. | 348/349 |
| 6,700,618 B1 | * | 3/2004 | Chubachi | 348/354 |

FOREIGN PATENT DOCUMENTS

JP    A 6-205268    7/1994

* cited by examiner

Primary Examiner—Vivek Srivastava
Assistant Examiner—Nelson D. Hernandez
(74) Attorney, Agent, or Firm—Oliff & Berridge, PLC

(57) ABSTRACT

A CPU calculates integrating values of image-capturing signals in a band 1 obtained by removing through a band pass filter a low frequency component of image-capturing signal output from an image-capturing device and integrating values of the image-capturing signals in a band 3 retaining the low frequency component intact, each calculated in correspondence to one of a plurality of lens positions. The CPU then obtains focal point evaluation values based upon these integrating values in correspondence to the individual bands. In addition, when it is judged that the image-capturing signals are saturated, the CPU calculates a new evaluation value parameter 1 history record=(focal point evaluation value history record in band 3−focal point evaluation value history record in band 1). The CPU then determines a new evaluation value parameter 1 history record extremal value through a 3-point interpolation operation and calculates a lens position corresponding to the extremal value.

4 Claims, 4 Drawing Sheets

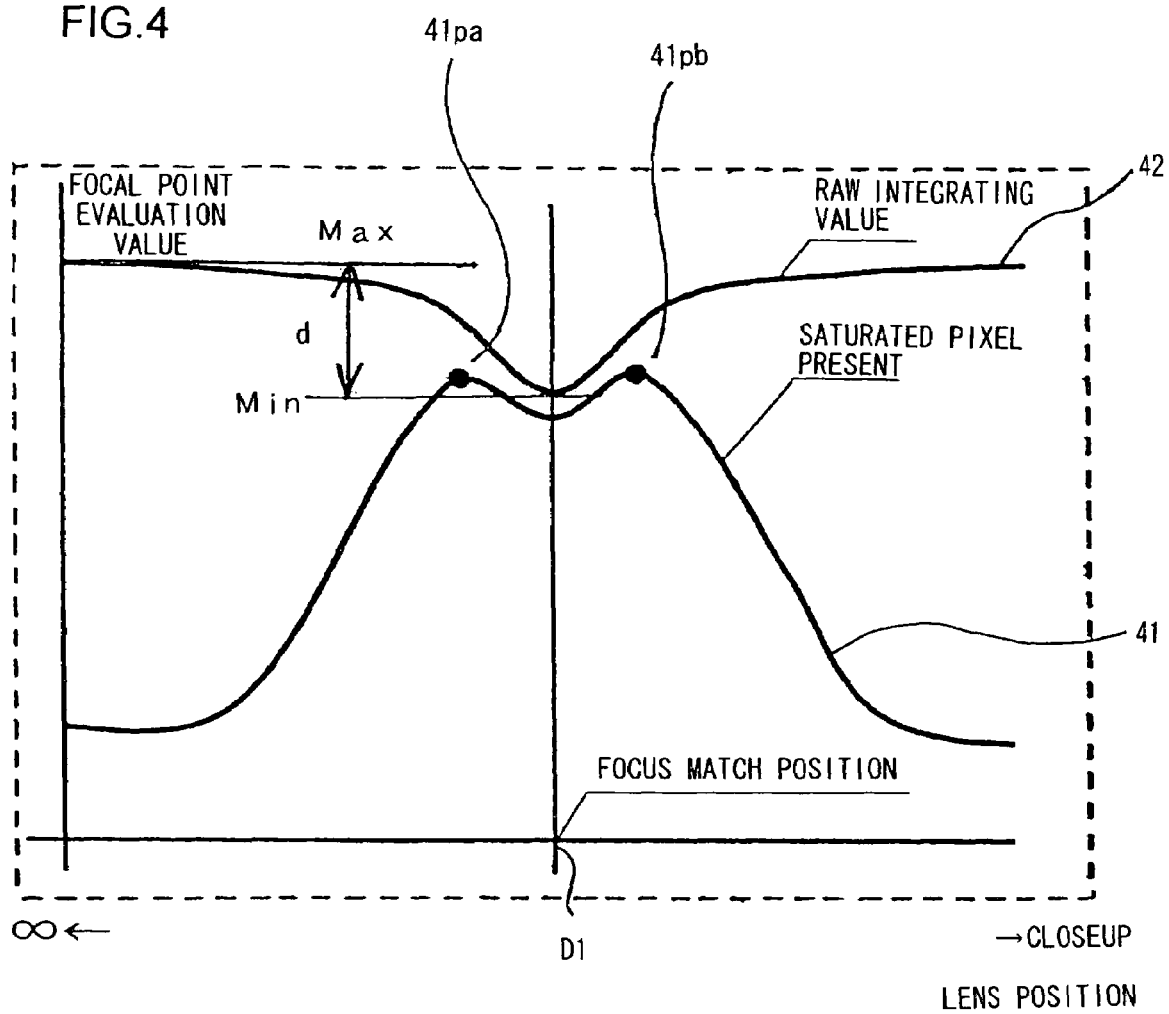

AUTOFOCUS CAMERA ADJUSTING FOCUS LENS POSITION BASED ON ILLUMINATION CHARACTERISTICS

INCORPORATION BY REFERENCE

The disclosure of the following priority application is herein incorporated by reference: Japanese Patent Application No. 2003-034870 filed Feb. 13, 2003

BACKGROUND OF THE INVENTION

1. Field of the Invention

The present invention relates to an autofocus camera.

2. Description of the Related Art

There are focal point detection methods known in the related art adopted in cameras to detect the state of focal point position adjustment of a photographic lens based upon image-capturing signals output from an image-capturing element such as a CCD that captures a subject image. In the so-called hill-climbing method among those camera focal point detectionmethods, while the focus lens moves forward/backward along the optical axis, a position at which the data corresponding to the high frequency component of the image-capturing signal, i.e., the focal point evaluation value, indicate the maximal value is detected as the focused position.

When the subject contains a light source with a high brightness level or the like, image-capturing signals corresponding to the light source become saturated. The saturated image-capturing signals indicate a uniform saturation-level value. Generally speaking, such image-capturing signals indicating a uniform level do not contain a significant high frequency component, and for this reason, it is difficult to accurately detect the focused position with saturated image-capturing signals.

Accordingly, Japanese Laid Open Patent Publication No. H 6-205268 discloses a camera that switches the low range cutoff frequency of a filter that allows the high-frequency component of image-capturing signals to pass through when capturing an image with a very bright subject. This camera counts the number of scanning lines in which the brightness signals indicate values greater than a predetermined value and judges that the brightness level of the subject is high when the scanning line count exceeds a predetermined number. If the brightness level of the subject is judged to be high, the camera switches to a high pass filter that cuts off the low frequency component of the brightness signals to a greater extent than the extent to which the low frequency component is cut off when the brightness level of the subject is not judged to be high. After making this switch, the camera detects the focused position by extracting the high-frequency component of the brightness signals having passed through the high pass filter.

However, under certain circumstances, the focal point evaluation value may still peak at the-focused position even when the brightness of the subject is high. In such a case, if the low range cutoff frequency of the filter which allows the high-frequency component of image-capturing signals to pass through is switched, the focused position cannot be accurately detected.

SUMMARY OF THE INVENTION

The present invention provides an autofocus camera capable of determining an accurate focused position even when image-capturing signals are saturated, e.g., even when the brightness level of the subject is high.

A camera according to the present invention comprises an image-capturing device that captures a subject image through a photographic lens; a filter device that removes a frequency component equal to or lower than a predetermined frequency from image-capturing signals output from the image-capturing device; a lens drive signal generation device that generates a lens drive signal used to move a focus lens; an evaluation value calculation device that calculates integrating values of pre-removal image-capturing signals still retaining the frequency component before the frequency component is removed by the filter device and integrating values of post-removal image-capturing signals from which the frequency component has been removed, each in correspondence to one of predefined positions of the focus lens; a lens position calculation device that calculates a focused lens position at which focus is achieved based upon the integrating values of the post-removal image-capturing signals calculated by the evaluation value calculation device; and a saturation determination device that judges the image-capturing device to be in a saturated state by using the pre-removal image-capturing signals. When the saturation determination device judges the image-capturing device to be in the saturated state, (a) the evaluation value calculation device calculates differences between the integrating values of the pre-removal image-capturing signals and the integrating values of the post-removal image-capturing signals each in correspondence to one of predefined positions of the focus lens and (b) the lens position calculation device calculates the focused lens position based upon the calculated differences.

A first cutoff frequency and a second cutoff frequency higher than the first cutoff frequency may be set at the filter device; and the camera may further comprise a filter control device that (a) controls the filter device to select the second cutoff frequency when the saturation determination device judges that the image-capturing device is in the saturated state and (b) controls the filter device to select the first cut off frequency when the saturation determination device does not judge that the image-capturing device is in the saturated state.

It is preferable the the saturation determination device judges the image-capturing device to be in the saturated state when (1) there is at least one integrating value calculated by using the image-capturing signals containing an image-capturing signal indicating a level equal to or higher than a predetermined level among the integrating values of the pre-removal image-capturing signals each calculated in correspondence to one of the predefined positions of the focus lens and (2) a difference between a maximum value and a minimum value among the integrating values of the pre-removal image-capturing signals is equal to or greater than a predetermined value.

BRIEF DESCRIPTION OF THE DRAWINGS

FIG. 4 presents an example of the relationships between the focus lens position and the focal point evaluation value curves in a band 1 and a band 3, that may manifest when the image-capturing signals corresponding to the main subject become saturated.

DESCRIPTION OF THE PREFERRED EMBODIMENT

The following is an explanation of an embodiment of the present invention, given reference to the drawings.

Figure 1:
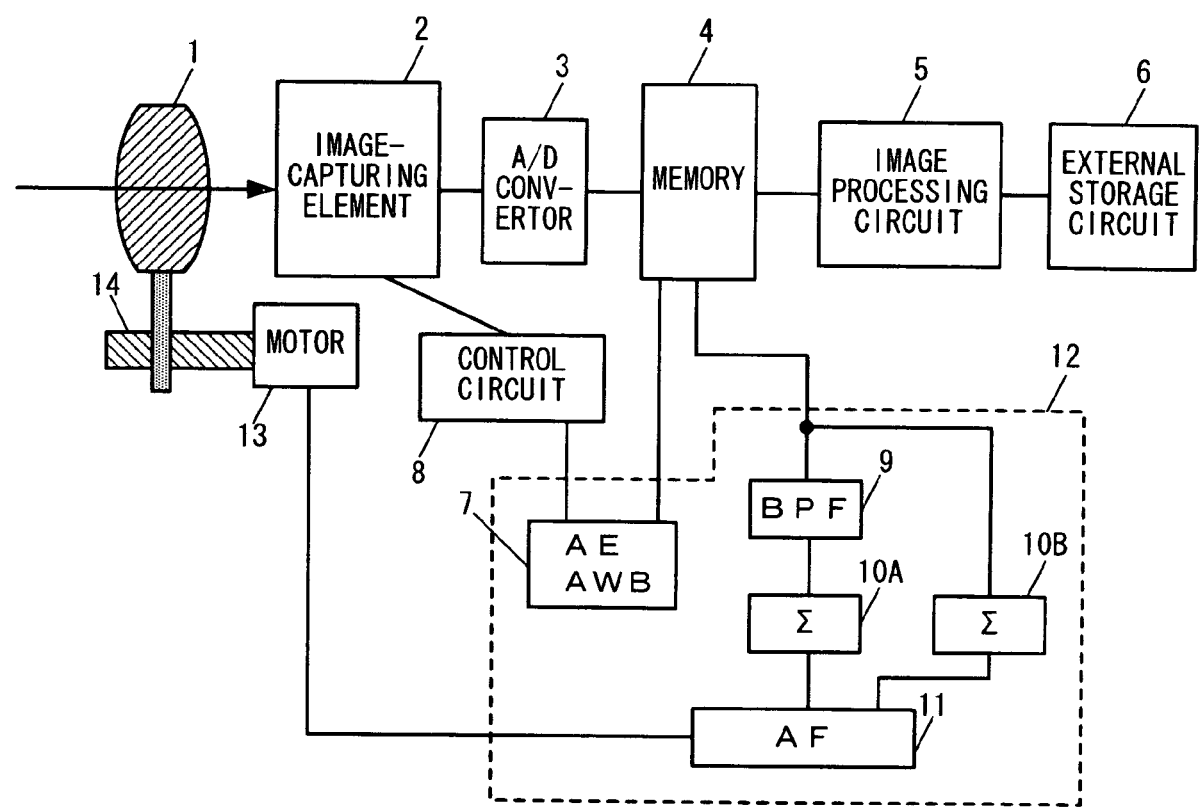
FIG. 1 is a block diagram showing the essential structural features of an autofocus (AF) electronic camera achieved in an embodiment of the present invention.

FIG. 1 is a block diagram showing the essential structural features of an autofocus (AF) electronic camera achieved in an embodiment of the present invention. The electronic camera in FIG. 1 includes a lens unit 1, an image-capturing element (image-capturing device) 2, an A/D converter 3, a memory 4, an image processing circuit 5, a control circuit 8, a CPU 12, a motor 13 and a focus control mechanism 14.

The lens unit 1 includes a focus lens (not shown). The focus lens is used to adjust the focal point position so as to form a subject image having passed through the lens unit 1 onto an image-capturing surface of the image-capturing element 2. As the motor 13 drives the focus control mechanism 14, the focus control mechanism 14 causes the focus lens to move forward/backward along the optical axis. The motor 13 is driven with a lens drive signal output from the CPU 12.

The image-capturing element 2 may be constituted of, for instance, a two-dimensional CCD image sensor. The image-capturing element 2 captures the subject image on the image-capturing surface and outputs image-capturing signals each corresponding to a pixel. The signal levels of the image-capturing signals output from the image-capturing element 2 vary in correspondence to the intensity levels of the light entering the individual pixels. When the brightness of the subject is high and the intensity level of light entering a pixel exceeds a saturation level of light received by a photodiode constituting the pixel, the image-capturing signal output in correspondence to said pixel is output as a saturation level signal. If the intensity of the light entering a pixel is higher than the saturation level of light received by the photodiode, an image-capturing signal indicating the saturation level is output regardless of the specific level of the intensity of the incident light. It is to be noted that the image-capturing element 2 may be constituted by using MOS sensors or a CID instead of a CCD. The control circuit 8 generates a timing signal for the image-capturing element 2 and provides the timing signal to the image-capturing element 2.

The image-capturing signals output from the image-capturing element 2 are first converted to digital signals at the A/D converter 3 and are then stored into the memory 4. The image processing circuit 5 executes compression processing by adopting a specific method (e.g., JPEG) on the image data stored in the memory 4, and stores the image data having undergone the compression processing into an external storage circuit 6. The image processing circuit 5 executes decompression processing on compressed data read out from the external storage circuit 6, as well. The external storage circuit 6 maybe constituted of, for instance, a data storage member such as a memory card.

The CPU 12 includes an AE/AWB circuit 7, a band pass filter 9, integrating operation circuits 10A and 10B and an AF circuit 11. The CPU 12, which is connected with the control circuit 8, the memory 4 and the like, executes various types of arithmetic operations for focal point detection (AF), photometering (AE), white balance adjustment (AWB) and the like in the electronic camera and also executes sequence control for camera operations. Various operation signals are input from an operating member (not shown) to the CPU 12.

In response to the operation signals input from the operating member, the CPU 12 implements integrated management of the focal point detection control, the exposure control and the color balance control in the electronic camera.

The AE/AWB circuit 7 executes exposure calculation and white balance adjustment processing of the known art. The white balance adjustment processing is executed on image data stored in the memory 4.

The band pass filter 9 is used to extract a high frequency component of image data corresponding to a focal point detection area (focus area) in the image data stored in the memory 4 which have not undergone the image processing. The image data having undergone the filter processing at the band pass filter 9 do not contain as much low frequency component and, in particular, not as much DC component as the unfiltered image data. In the explanation of the embodiment, the frequency band of the image data from which the low frequency component has been removed through the band pass filter 9 is referred to as a band 1 and the frequency band of the unfiltered image data is referred to as a band 3.

The integrating operation circuits 10A and 10B each calculate an integrating value of the image data corresponding to the pixels contained in the focus area. The integrating operation circuit 10A calculates the integrating value of the image data in band 1, whereas the integrating operation circuit 10B calculates the integrating value of the image data in band 3. The integrating operation circuits calculate the integrating values of the absolute values indicated by the individual sets of image data in order to determine the integrating value of the difference attributable to the high frequency component. The integrating value calculated at the integrating operation circuit 10B is equivalent to a value obtained by directly integrating the values of the image-capturing signals from the image-capturing element, and contains information indicating a subject brightness level.

Figure 2:
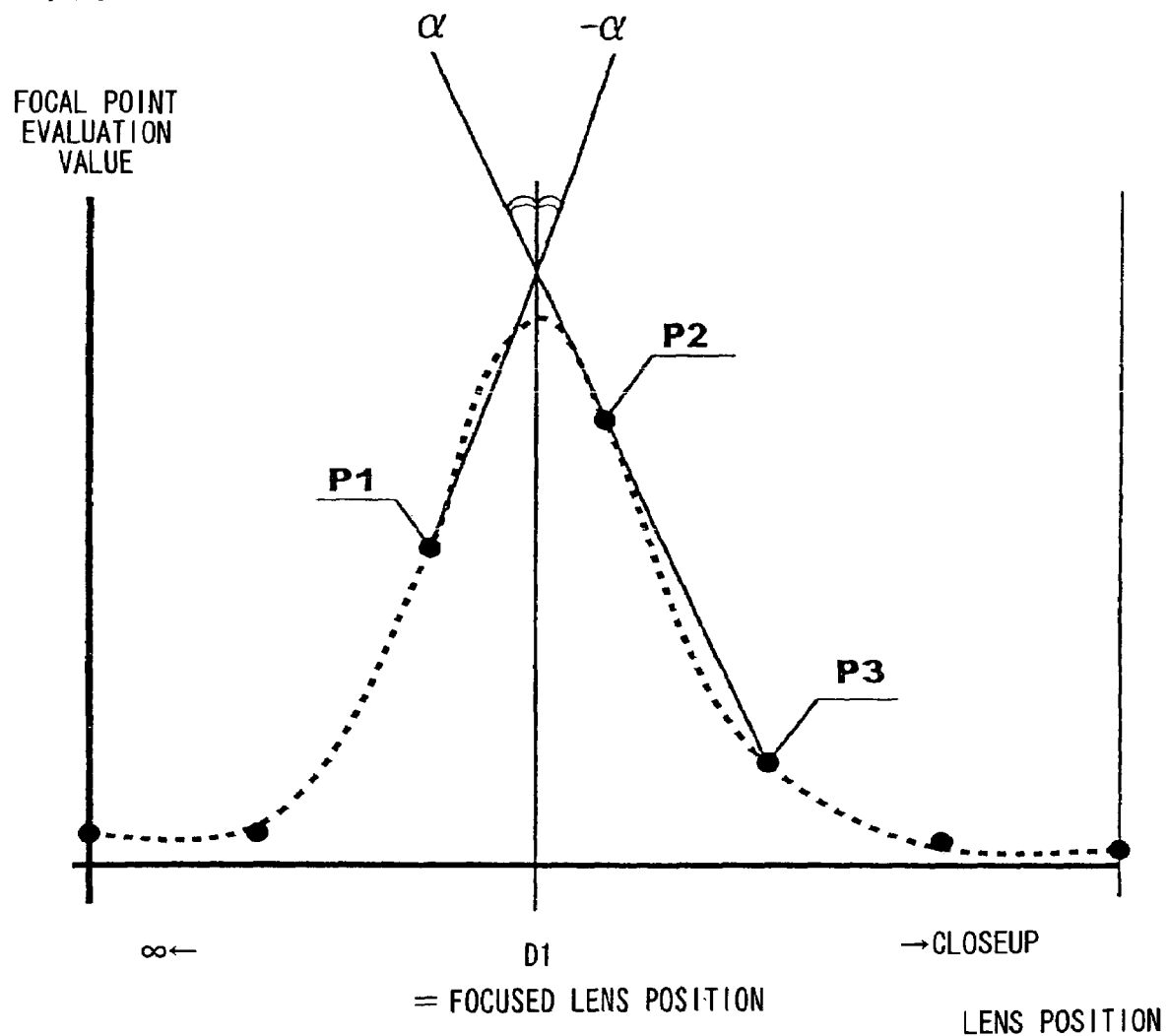
FIG. 2 presents an example of the relationship between the focus lens position and the focal point evaluation value.

The AF circuit 11 obtains focal point evaluation values by using the integrating values calculated at the integrating operation circuits 10A and 10B. FIG. 2 presents an example of the relationship between the position of the focus lens (not shown) in the lens unit 1 and the focal point evaluation value. In FIG. 2, the focus lens position is indicated along the horizontal axis and the focal point evaluation value is indicated along the vertical axis. A lens position D1 at which the focal point evaluation value peaks is the focused position at which the focus lens achieves focus on the main subject.

The focal point evaluation value is calculated by, for instance, moving the focus lens from the ∞ (infinite distance) end toward the closeup end. The calculation rate at which the AF circuit 11 repeatedly calculates the focal point evaluation value is determined by the length of image-capturing period at the image-capturing element 2 and the length of time required to execute the filter processing and the integrating value calculation. For this reason, the focal point evaluation value is plotted as discrete data at the calculation rate, as indicated by the filled circles ● in FIG. 2. The AF circuit 11 calculates the lens position D1 corresponding to the maximal point of the focal point evaluation value curve by executing a so-called 3-point interpolation calculation with three points P1 to P3 corresponding to the focal point evaluation data, which include the point corresponding to the largest value indicated by the discrete data. The lens position D1 is equivalent to the intersecting point at which a straight line with an inclination α which passes through the largest value point P2 and the point P3 and a straight line with an inclination—α which passes through the point P1 intersect each other. At the lens position D1, any loss of sharpness around the edges of the subject image captured by the image-capturing element 2 is eliminated and the contrast of the image is optimized.

The present invention is characterized in that when an image-capturing signal is judged to have reached the saturation level during the focal point detection processing described above, focal point evaluation values are obtained by using the integrating values calculated at the integrating operation circuits 10A and 10B and when an image-capturing signal is judged to be under the saturation level, focal point evaluation values are obtained by using the integrating values calculated at the integrating operation circuit 10A.

Figure 3:
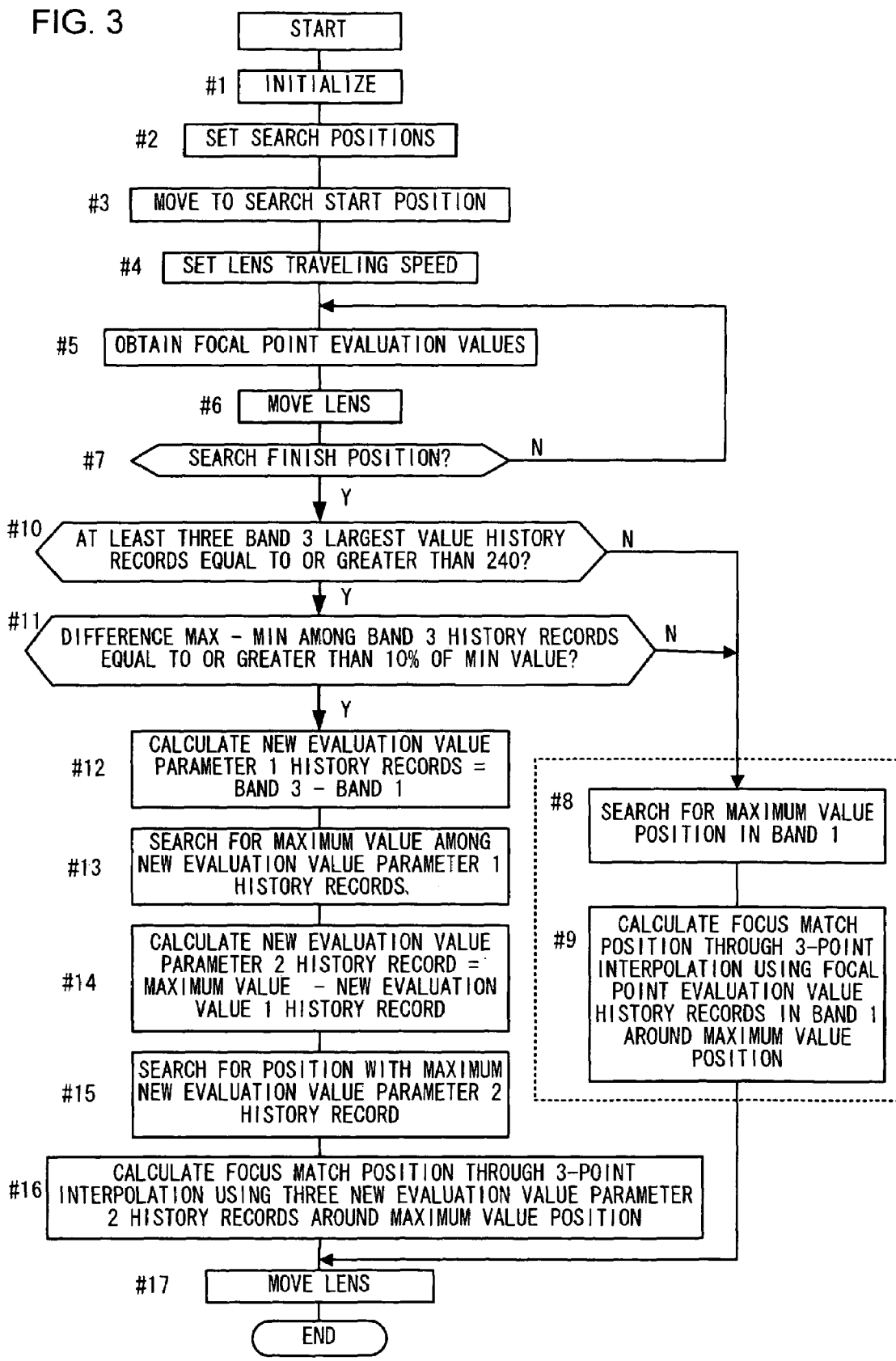
FIG. 3 presents a flowchart of the AF processing executed at a CPU.

An explanation is now given in reference to the flowchart presented in FIG. 3 on the AF processing executed at the CPU 12 of the AF electronic camera described above. The processing in FIG. 3 is started as, for instance, a halfway press operation signal is input from a shutter release switch (not shown) to the CPU 12. In step #1, the CPU 12 initializes flags and the like necessary for the processing and then the operation proceeds to step #2.

In step #2, the CPU 12 sets search positions, before the operation proceeds to step #3. In the embodiment, a search start position is set at the ∞ end and the search finish position is set at the closeup end. It is to be noted that the search start position may be set at the closeup end and the search finish position may be set at the ∞ end instead. In step #3, the CPU 12 outputs a drive signal to the motor 13 so as to move the focus lens (not shown) to the search start position, and then the operation proceeds to step #4.

In step #4, the CPU 12 sets the lens traveling speed before the operation proceeds to step #5. The length of time over which the focus lens travels from the search start position to the search finish position is determined in correspondence to the traveling speed. As the lens traveling speed is lowered, the number of sets of data used to plot the focal point evaluation value curve in FIG. 2 increases, whereas the number of sets of plotted data decreases as the lens traveling speed is raised. For this reason, it is desirable to set the lens traveling speed by ensuring that there will be at least three sets of data to be plotted to form a "peak" in the focal point evaluation value curve.

In step #5, the CPU 12 obtains the integrating values calculated at the integrating operation circuits 10A and 10B and stores them individually in the AF circuit 11 in correspondence to information indicating the specific focus lens position. Then the operation proceeds to step #6. The position of the focus lens is obtained by, for instance, reading the information indicating the lens position from the focus control mechanism 14.

In step #6, the CPU 12 outputs a drive signal to the motor 13 and then the operation proceeds to step #7. In response, the drive of the focus lens starts at the lens traveling speed set as described earlier. In step #7, the CPU 12 makes a decision as to whether or not the focus lens is at the search finish position. The CPU 12 makes an affirmative decision in step #7 if the focus lens is judged to be at the search finish position and in this case, the operation proceeds to step #10. If, on the other hand, the focus lens has not reached the search finish position, a negative decision is made in step #7 and the operation returns to step #5.

Through the processing executed in steps #5 to #7 as described above, a plurality of focal point evaluation values forming focal point evaluation value curves are obtained while the focus lens moves from the search start position to the search finish position. In this document, the plurality of focal point evaluation values forming the focal point evaluation value curve are referred to as focal point evaluation value history records. Two sets of focal point evaluation value history records are obtained, one by using the image data in band 1 and the other by using the image data in band 3.

In step #10, the CPU 12 makes a decision as to whether or not there are at least three largest value history records in band 3. A largest value history record refers to a focal point evaluation value indicating that there is at least one set of image data with a signal level equal to or higher than 240 among the image data the integrating value of which has been calculated by the integrating operation circuit 10B. The signal level 240 is an example of a decision-making threshold value that may be used when the A/D converter 3 has an 8-bit output (256 in full-scale). If the signal level is 240 or higher, the photodiode constituting the pixel corresponding to this particular set of image data is considered to be in a saturated state.

The CPU 12 makes an affirmative decision in step #10 if there are image data with signal levels equal to or higher than 240 within the focus area at three or more focus lens positions, and in such a case, the operation proceeds to step #11. If, on the other hand, there are fewer than three focus lens positions at which the signal levels are equal to or higher than 240, a negative decision is made in step #10 and the operation proceeds to step #8.

In step #11, a decision is made as to whether or not the difference between the largest value Max and the smallest value Min among the focal point evaluation value history records in band 3, i.e., Max-Min, is equal to or greater than a predetermined decision-making threshold value (e.g., 10 percent of the Min value). FIG. 4 shows a relationship of a focal point evaluation value curve 41 in band 1 and a focal point evaluation value curve 42 in band 3 to the focus lens position that may manifest when the image-capturing signals corresponding to the main subject become saturated. In FIG. 4, the focal point evaluation value curve 41 in band 1 peaks at "crests" offset from the focused position (a peak 41 pa further toward the ∞ end relative to the focused position D1 and a peak 41 pb further toward the closeup end relative to the focused position D1). This indicates that as the image-capturing signals become saturated and are detected as signals with a uniform saturation level in the vicinity of the focused position D1, the high frequency component in the image data is reduced near the focal point position D1.

The focal point evaluation value curve 42 in band 3 in FIG. 4, on the other hand, "dips" at the focused position. This also indicates that the image-capturing signals are detected as signals with a uniform saturation level and thus, the high frequency component in the image data is reduced.

The CPU 12 makes an affirmative decision in step #11 if the difference d between the largest value Max and the smallest value Min in the focal point evaluation value curve 42 in band 3 is equal to or greater than 10% of the Min value, and the operation proceeds to step #12. In this situation, the image-capturing signals corresponding to the main subject are regarded to be in a saturated state. The CPU 12 makes a negative decision in step #11 if the difference d between the largest value Max and the smallest value Min is less than 10% of the Min value and then the operation proceeds to step #8. In this case, the image-capturing signals corresponding to the main subject are regarded to be in an unsaturated state. As described above, the integrating values in band 3 contain information corresponding to the low frequency component indicating the subject brightness. If the focal point evaluation value curve 42 indicates a substantially constant value (if the focal point evaluation value curve takes on the contour of an almost flat straight line), the image-capturing signals can be considered to be in an unsaturated state. If, on the other hand, the focal point evaluation value curve contains a "dip" as shown in FIG. 4, the image-capturing signals are considered to be in a saturated state.

In step #12, the CPU 12 calculates a new evaluation value parameter 1 history record=(focal point evaluation value history record in band 3−focal point evaluation value history record in band 1), before the operation proceeds to step #13. This new evaluation value parameter 1 history record is calculated in correspondence to each focus lens position with the focal point evaluation value history records. In step #13, the CPU 12 searches for a largest value NewMax1 among the new evaluation value parameter 1 history records, and then the operation proceeds to step #14.

Instep #14, the CPU 12 calculates a new evaluation value parameter 2 history record=(NewMax1−new evaluation value parameter 1 history record) before the operation proceeds to step #15. This new evaluation value parameter 2 history record is calculated in correspondence to each focus lens position with a new evaluation value parameter 1 history record. In step #15, the CPU 12 searches for a largest value NewMax2 among the new evaluation value parameter 2 history records, and then the operation proceeds to step #16.

In step #16, the CPU 12 executes a 3-point interpolation calculation by using the largest value NewMax2 and the two values corresponding to points preceding and succeeding the largest value NewMax2 among the new evaluation value parameter 2 history records to calculate a lens position D1 (New) corresponding to the maximal point of a new evaluation value parameter 2 history record curve. Once the lens position D1 (New) is calculated, the CPU 12 proceeds to step #17. In step #17, the CPU 12 outputs a lens drive signal to the motor 13 to cause the focus lens (not shown) to travel from the search finish position to the lens position D1 (new), before ending the processing in FIG. 3. It is to be noted that if the lens position cannot be calculated due to, for instance, low contrast in the subject image, the focus lens moves to a predetermined default position.

In step #8 to which the operation proceeds after making a negative decision in step #10 or step #11, the CPU 12 searches for a largest value Max 3 among the focal point evaluation value history records in band 1 and then the operation proceeds to step #9.

In step #9, the CPU 12 executes a 3-point interpolation calculation by using the largest value Max3 and the two value corresponding to points preceding and succeeding the largest value Max3 among the focal point evaluation value history records in band 1 to calculate a lens position D1 corresponding to the maximal point of the focal point evaluation value history record curve in band 1. Once the lens position D1 is calculated, the CPU 12 proceeds to step #17.

The embodiment explained above is now summarized.
(1) The autofocus electronic camera that calculates focal point evaluation values by using the image-capturing signals corresponding to the focus area executes the focal point detection processing as described below. While the focus lens travels from the ∞ end to the closeup end, the integrating value of the image-capturing signals in band 1 from which the low frequency component has been removed and the integrating value of the image-capturing signals in band 3 retaining the low frequency components are obtained each in correspondence to one of a plurality of lens positions. Using these integrating values, the camera obtains focal point evaluation values in correspondence to the individual bands. If it is judged that the image-capturing signals corresponding to the main subject are in a saturated state (if an affirmative decision is made both in step #10 and in step #11), the camera calculates a new evaluation value parameter 1 history record by subtracting the focal point evaluation value history record in band 1 from the focal point evaluation value history record in band 3 in correspondence to each focus lens position. Then, it determines the maximal value in the new evaluation value parameter 1 history record curve through a 3-point interpolation calculation and calculates the lens position D1 (new) in correspondence to the maximal value. Thus, unlike the related art in which the image-capturing signals in only one of the plurality of bands is used, the focused position can be detected with a high degree of accuracy even when image-capturing signals are in a saturated state, as long as either the focal point evaluation value history records obtained based upon the image-capturing signals in band 1 or the focal point evaluation value history records obtained based upon the image-capturing signals in band 3 include a maximal value.
(2) The decision as to whether or not image-capturing signals are in a saturated state is made by executing decision-making processing in two steps (steps #10 and #11). In particular, in step 11, the image-capturing signals corresponding to the main subject are judged to be in a saturated state if the difference d between the largest value Max and the smallest value Min in the focal point evaluation value curve 42 in band 3 is equal to or greater than 10% of the Min value. Therefore, it is possible to accurately ascertain a state in which the focal point evaluation value history records in band 3 include a maximal value (a state in which a "dip" in the focal point evaluation value curve 42 is greater than a predetermined value) so as to execute the focal point detection processing.
(3) If it is judged that the image-capturing signals corresponding to the main subject are not in a saturated state (if a negative decision is made either in step #10 or in step #11), the camera determines a maximal value of the focal point evaluation value history record in band 1 through a 3-point interpolation calculation and then calculates the lens position D1 corresponding to the maximal value. Since the focal point evaluation history records obtained based upon the image-capturing signals in band 1 include a maximal value at the focused position unless the image-capturing signals are in a saturated state, the focused position can be detected with a high degree of accuracy.

While an affirmative decision is made in step #10 if there are at least three largest value history records (in correspondence to at least three focus lens positions) in the explanation provided above, an affirmative decision may be made if there is one largest value history record or if there are five largest value history records instead of three largest value history records.

While an explanation is given above on an example in which an affirmative decision is made in step #11 if the difference is equal to or greater than 10% of the Min value, an affirmative decision maybe made if the difference is equal to or greater than 5% or 20% of the Min value, instead of 10%.

The processing in steps #13 and #14 is executed to calculate the new evaluation value parameter 2 history record curve with a maximal value based upon the new evaluation value parameter 1 history record curve with a minimal value so as to invert the new evaluation value parameter 1 history record curve. However, steps #13 and #14 may be skipped. If the processing in steps #13 and #14 is skipped, the operation proceeds directly from step #12 to step #15 in which the CPU 12 searches for a smallest value NewMin1 among the new evaluation value parameter 1 history records. Then, the operation proceeds to step #16. In step #16, the CPU 12 executes a 3-point interpolation processing using three values, i.e., the smallest value NewMin1 and the two values at the points preceding and following the smallest value to calculate a lens position D1 (New) corresponding to the minimal point in the new evaluation value parameter 1 history record curve.

While the CPU 12 executes the filter processing and the integrating operation processing by using the image data having been stored in the memory 4, it may instead execute the filter processing and the integrating operation processing by using data sequentially input thereto from the A/D converter 3.

In the explanation provided above, the processing in steps #12 through #16 is executed if the image-capturing signals corresponding to the main subject are judged to be in a saturated state and the processing in steps #8 and #9 is executed if the image-capturing signals are judged to be in an unsaturated state. Instead, the two types of processing may be executed at all times to use the focused position determined through the processing executed in steps #12 through #16 if the image-capturing signals are judged to be in a saturated state and to use the focused position determined through the processing executed in steps #8 and #9 if the image-capturing signals are judged to be in an unsaturated state.

In the explanation provided above, the band pass filter 9 always executes a specific type of filter processing. Alternatively, the low range cutoff frequency maybe switched. In such a case, the band pass filter 9 should be structured so as to allow either a first low range cutoff frequency or a second low range cutoff frequency which is higher than the first low range cutoff frequency to be set. The CPU 12 selects the second low range cutoff frequency for the cutoff frequency of the band pass filter 9 if the image-capturing signals are judged to be in a saturated state, and selects the first low range cutoff frequency as the cutoff frequency of the band pass filter 9 if the image-capturing signals are judged to be in an unsaturated state. Namely, if the image-capturing signals are judged to be in a saturated state, the focal point detection processing is executed based upon the focal point evaluation value history records obtained based upon the image-capturing signals in band 3 and the focal point evaluation value history records obtained based upon the image-capturing signals the low frequency component of which is cut off at the second low range cutoff frequency. If, on the other hand, the image-capturing signals are judged to be in an unsaturated state, the focal point detection processing is executed based upon focal point evaluation value history records obtained by using the image-capturing signals, the low frequency component of which is cut off at the first low range cutoff frequency.

In the explanation provided above, image-capturing signals indicating the saturation level are output from the image-capturing element 2 if the intensity level of light entering the image-capturing element 2 is higher than the saturation level of the photodiodes constituting the pixels. However, image-capturing signals indicating the saturation level may be output from the image-capturing element 2 when a significant length of time is set at the image-capturing element 2 as the charge storage period and the quantities of stored charges exceed a specific storage limit, as in a photographing operation executed at a low shutter speed. The present invention may be adopted to detect a saturated state at the image-capturing element 2 under such circumstances as well.

The present invention may be adopted in a focal point detection device in a silver halide camera as well as in an electronic camera.

In the explanation of the embodiment, a state in which the photodiode constituting a pixel is saturated, for instance, is referred to a saturated state at the image-capturing element. In addition, a new evaluation value parameter 1 history record or a new evaluation value parameter 2 history record indicates the difference between an integrating value of image-capturing signals still containing the low frequency component prior to the removal thereof and an integrating value of the image-capturing signals from which the low frequency component has been removed. It is to be noted that components other than those explained above may be adopted as long as the functions characterizing the present invention are sustained intact.

As explained above, the camera achieved in the embodiment of the present invention detects the focused position by using a plurality of sets of image-capturing signals corresponding to different bands when image-capturing signals become saturated and thus, unlike in a camera that uses only the image-capturing signals corresponding to a single band, focus can be achieved accurately.

The above described embodiment is an example, and various modifications can be made without departing from the spirit and scope of the invention.

What is claimed is:

1. A camera comprising:
   an image-capturing device that captures a subject image through a photographic lens;
   a filter device that removes a frequency component equal to or lower than a predetermined frequency from image-capturing signals output from the image-capturing device;
   a lens drive signal generation device that generates a lens drive signal used to move a focus lens;
   an evaluation value calculation device that calculates integrating values of pre-removal image-capturing signals still retaining the frequency component before the frequency component is removed by the filter device and integrating values of post-removal image-capturing signals from which the frequency component has been removed, each in correspondence to one of predefined positions of the focus lens;
   a lens position calculation device that calculates a focused lens position at which focus is achieved based upon the integrating values of the post-removal image-capturing signals calculated by the evaluation value calculation device; and
   a saturation determination device that judges the image-capturing device to be in a saturated state by using the pre-removal image-capturing signals, wherein:
   when the saturation determination device judges the image-capturing device to be in the saturated state, (a) the evaluation value calculation device calculates differences between the integrating values of the pre-removal image-capturing signals and the integrating values of the post-removal image-capturing signals each in correspondence to one of predefined positions of the focus lens and (b) the lens position calculation device calculates the focused lens position based upon the calculated differences.

2. A camera according to claim 1, wherein:
a first cutoff frequency and a second cutoff frequency higher than the first cutoff frequency are set at the filter device; and
the camera further comprises a filter control device that (a) controls the filter device to select the second cutoff frequency when the saturation determination device judges that the image-capturing device is in the saturated state and (b) controls the filter device to select the first cutoff frequency when the saturation determination device does not judge that the image-capturing device is in the saturated state.

3. A camera according to claim 2, wherein:
the saturation determination device judges the image-capturing device to be in the saturated state when (1) there is at least one integrating value calculated by using the image-capturing signals containing an image-capturing signal indicating a level equal to or higher than a predetermined level among the integrating values of the pre-removal image-capturing signals each calculated in correspondence to one of the predefined positions of the focus lens and (2) a difference between a maximum value and a minimum value among the integrating values of the pre-removal image-capturing signals is equal to or greater than a predetermined value.

4. A camera according to claim 1, wherein:
the saturation determination device judges the image-capturing device to be in the saturated state when (1) there is at least one integrating value calculated by using the image-capturing signals containing an image-capturing signal indicating a level equal to or higher than a predetermined level among the integrating values of the pre-removal image-capturing signals each calculated in correspondence to one of the predefined positions of the focus lens and (2) a difference between a maximum value and a minimum value among the integrating values of the pre-removal image-capturing signals is equal to or greater than a predetermined value.

* * * * *